US008164839B2

(12) United States Patent  
Nasu

(10) Patent No.: US 8,164,839 B2  
(45) Date of Patent: Apr. 24, 2012

(54) ENDOSCOPE AND OBJECTIVE LENS FOR THE SAME

(75) Inventor: Sachiko Nasu, Tokyo (JP)

(73) Assignee: Hoya Corporation, Tokyo (JP)

(*) Notice: Subject to any disclaimer, the term of this patent is extended or adjusted under 35 U.S.C. 154(b) by 146 days.

(21) Appl. No.: 12/830,495

(22) Filed: Jul. 6, 2010

(65) Prior Publication Data

US 2011/0002052 A1    Jan. 6, 2011

(30) Foreign Application Priority Data

Jul. 6, 2009 (JP) ................... 2009-160289

(51) Int. Cl.
| G02B 9/34 | (2006.01) |
| G02B 21/02 | (2006.01) |
| G02B 9/08 | (2006.01) |
| A61B 1/06 | (2006.01) |

(52) U.S. Cl. ......... 359/783; 359/661; 359/740; 600/162

(58) Field of Classification Search ............... 359/362, 359/661, 740, 770, 783, 793; 600/162, 163, 600/166–168
See application file for complete search history.

(56) References Cited

U.S. PATENT DOCUMENTS

| 5,587,839 | A | 12/1996 | Miyano et al. |
| 7,885,010 | B1* | 2/2011 | Bodor et al. ............... 359/660 |
| 2004/0240081 | A1 | 12/2004 | Saito |

FOREIGN PATENT DOCUMENTS

| JP | 02-293709 | 12/1990 |
| JP | 06-308381 | 11/1994 |
| JP | 08-122632 | 5/1996 |
| JP | 2004-61763 | 2/2004 |
| JP | 2004-354888 | 12/2004 |
| JP | 2007-249189 | 9/2007 |

* cited by examiner

*Primary Examiner* — William Choi  
(74) *Attorney, Agent, or Firm* — Greenblum & Bernstein, P.L.C.

(57) ABSTRACT

An objective lens for an endoscope, including a negative front lens group and a positive rear lens group arranged such that an aperture stop is positioned therebetween, wherein the front lens group has at least a front-side negative lens and a front-side positive lens arranged in this order from an object side, and the rear lens group has at least a rear-side positive lens and a cemented lens arranged in this order from the object side, the cemented lens being configured by cementing together negative and positive lenses. The objective lens satisfies following conditions: $-4.5 \leq f_F/f \leq -2.0$ and $1.5 \leq f_{RP}/f \leq 2.5$, where $f_F$ (unit: mm) represent of the front lens group, f (unit: mm) represents a total focal length of the front lens group and the rear lens group, and $f_{RP}$ (unit: mm) represents a focal length of the rear-side positive lens.

14 Claims, 10 Drawing Sheets

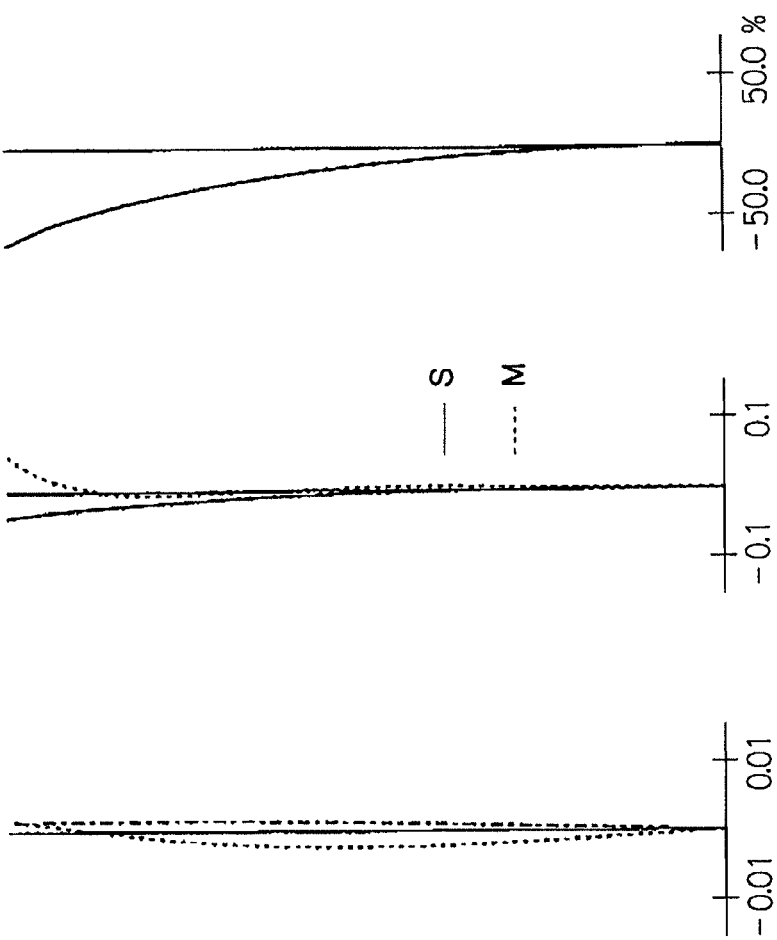

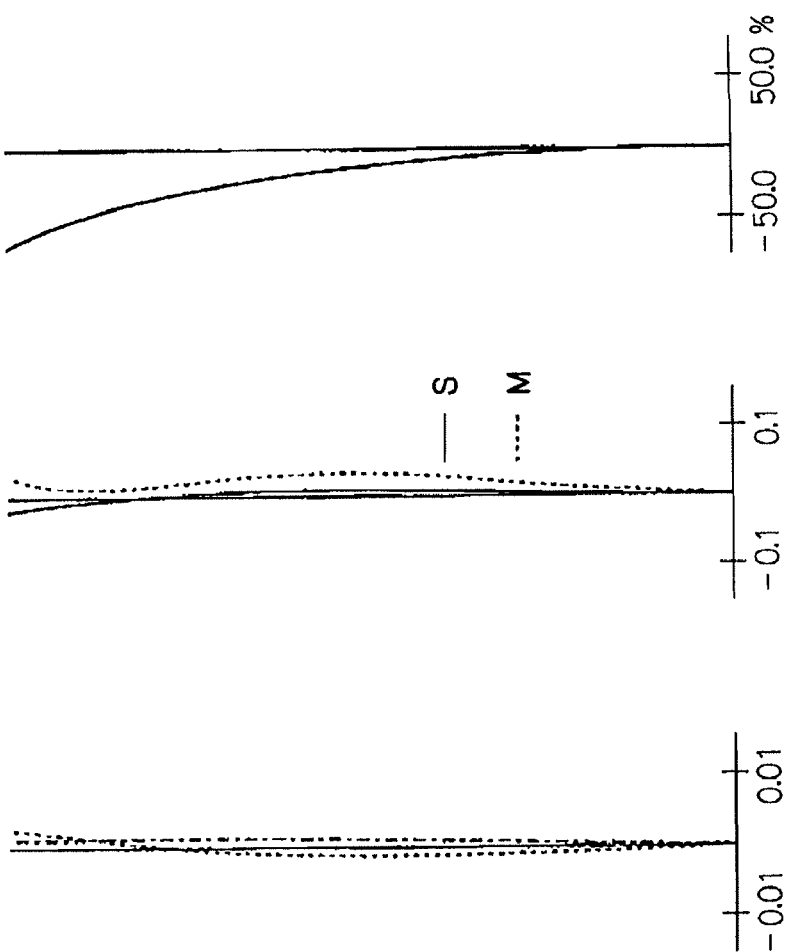

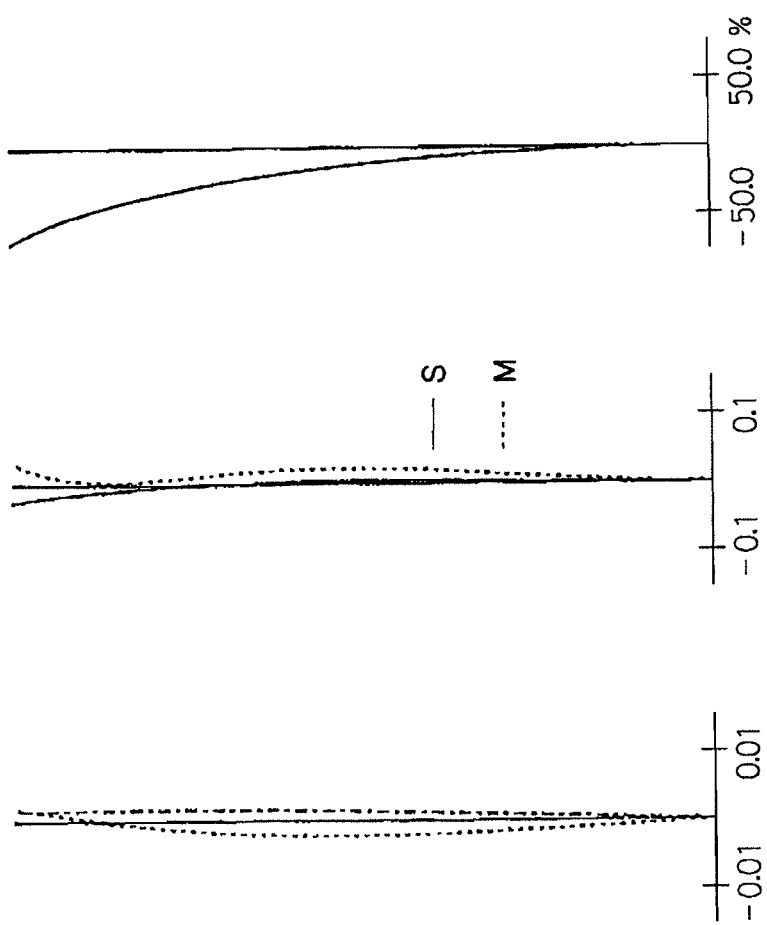

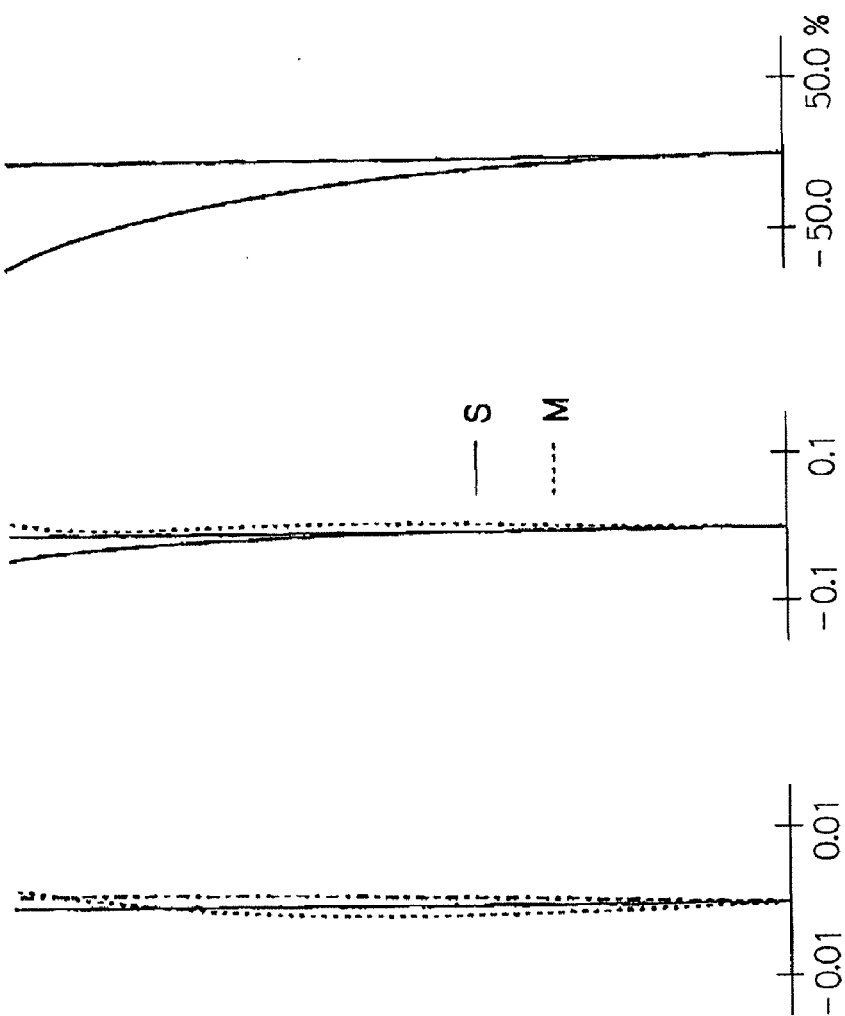

ENDOSCOPE AND OBJECTIVE LENS FOR THE SAME

BACKGROUND OF THE INVENTION

The present invention relates to an endoscope used when a doctor conducts diagnosis on an body cavity and an objective lens for an endoscope arranged in a tip portion of the endoscope. In particular, the present invention relates to an objective lens for an endoscope configured such that change of an angle of view and change of curvature of field due to a manufacturing error and an assembling error are suppressed suitably, and to an endoscope on which such an objective lens is installed.

Medical endoscopes, such as a fiber scope or an electronic endoscope, are widely used by doctors for medical diagnosis for a body cavity of a patient. A tip part of an endoscope of this type is designed to be compact in size so that an insertion unit thereof can be smoothly inserted into a small space, such as a body cavity of a patient. In the tip part of the endoscope, various types of components are accommodated. It is understood that the minimum design outer dimension of the tip part of the endoscope is defined by one or more of the accommodated components (e.g., an objective lens) having a relatively large size in the tip part. Therefore, in order to downsize the tip part of the endoscope, it is desirable to downsize the objective lens by employing lenses having small sizes and by decreasing the number of lenses forming the objective lens.

In general, the objective lens is designed to have a wide angle of view to widen an observation field and thereby to enable a doctor to easily find an affected area of the patient. In particular, in a product field of digestive endoscopes adapted to diagnosis of a wide area such as a stomach, the endoscope is designed to have a considerably wide angle of view. However, in general, an optical lens shows a property that a curvature of field increases in proportion to the square of the angle of view, and thereby the image quality is deteriorated. In order to obtain a high quality image to be used for accurate diagnosis, the objective lens for an endoscope is required to be small in size and have high optical performance.

Incidentally, in principle, a manufacturing error caused during processing of optical lenses does not vary even if optical lenses vary in design size. Therefore, change of the optical performance with respect to a manufacturing error becomes more noticeable as the size of the optical lens becomes small. Similarly, change of the optical performance due to an assembling error becomes more noticeable as the size of an optical unit becomes small. The fact that the objective lens of the endoscope needs to decrease the number of lenses and thereby to increase a power to be assigned to each lens of the objective lens also badly affects the above described change of the optical performance. That is, in order to achieve the high optical performance, it is necessary to process and position each optical lens of the objective lens with a high degree of accuracy.

Regarding a small size and wide angle of view objective lens for an endoscope, change of the angle of view and change of the curvature of field due to a manufacturing error and an assembling error are seen as problems. In order to achieve the high optical performance, a manufacturer of the endoscope might considers countermeasures where strict management of manufacturing tolerances is conducted to manufacture an optical lens having an extremely low level of manufacturing error or a peripheral component arranged around the optical lens having an extremely low level of manufacturing error. However, in this case, a problem arises that the yield decreases and the manufacturing unit price increases. In addition, regarding a small size optical lens, grasping and managing the occurred error amounts are technically difficult. Therefore, strict management of manufacturing tolerances can not be employed.

Examples of concrete configurations of objective lenses of an endoscope are disclosed, for example, in Japanese Patent Provisional Publications No. HEI 2-293709A (hereafter, referred to as JP HEI 2-293709A), No. HEI 6-308381A (hereafter, referred to as JP HEI 6-308381A), No. HEI 8-122632A (hereafter, referred to as HEI 8-122632A), No. 2004-61763A (hereafter, referred to as 2004-61763A), No. 2004-354888A (hereafter, referred to as JP2004-354888A), and No. 2007-249189A (hereafter, referred to as JP2007-249189A). Regarding objective lenses disclosed in the publications, designers have tried to correct aberrations as compensation for designing an objective lens to be compact in size and to have a wide angle of view. However, according to the configurations of the objective lenses disclosed in the publications, change of the angle of view and change of the curvature of field due to a manufacturing error and an assembling error are not suppressed sufficiently, and in actuality it is difficult to achieve the suitable optical performance if strict management of manufacturing tolerances is not conducted.

SUMMARY OF THE INVENTION

The present invention is advantageous in that it provides an objective lens for an endoscope configured to suitably suppress change of an angle of view and change of curvature of field due to a manufacturing error and an assembling error while having a small size and having a wide angle of view, and provides an endoscope on which the objective lens is installed.

According to an aspect of the invention, there is provided an objective lens for an endoscope, which is provided with: a front lens group having a negative power; and a rear lens group having a positive power arranged such that an aperture stop is positioned between the front lens group and the rear lens group. In this configuration, the front lens group comprises at least a front-side negative lens and a front-side positive lens arranged in this order from an object side, and the rear lens group comprises at least a rear-side positive lens and a cemented lens arranged in this order from the object side, the cemented lens being configured by cementing together a negative lens and a positive lens. The objective lens satisfies following conditions:

$$-4.5 \leq f_F/f \leq -2.0 \quad (1); \text{ and}$$

$$1.5 \leq f_{RP}/f \leq 2.5 \quad (2)$$

where $f_F$ (unit: mm) represents a focal length of the front lens group, f (unit: mm) represents a total focal length of the front lens group and the rear lens group, and $f_{RP}$ (unit: mm) represents a focal length of the rear-side positive lens.

With this configuration, it becomes possible to provide an objective lens for an endoscope configured to suitably suppress change of an angle of view and change of curvature of field due to a manufacturing error and an assembling error while having a small size and having a wide angle of view, and provides an endoscope in which the objective lens is installed.

When $f_F/f$ gets larger than the upper limit of the condition (1), the deviated curvature of field due to deviation of the front lens group due to a positional error of installation of the front lens group can be suppressed. However, in this case change of magnification of the rear lens group due to change of an interval between the front-side positive lens and the rear-side positive lens can not be suppressed, and thereby change of the angle of view becomes large. As a result, the angle of view satisfying the specification can not be secured.

When $f_F/f$ gets smaller than the lower limit of the condition (1), change of magnification of the rear lens group due to change of the interval between the front-side positive lens and the rear-side positive lens can be suppressed, and therefore the change of the angle of view becomes small. However, in this case, it becomes necessary to set the magnification of the front lens group to be large, and thereby it becomes impossible to suppress the deviated curvature of field caused by a positional error of installation of the front lens group.

When $f_{RP}/f$ gets larger than the upper limit of the condition (2), the amount of assigned power of the rear-side positive lens can be reduced, and thereby the deviated curvature of field due to deviation of the rear-side positive lens can be suppressed. However, in this case, it becomes necessary to assign a relatively large magnification to the front lens group, and thereby it becomes impossible to suppress the deviated curvature of field due to a positional error of installation of the front lens group. In another aspect, it becomes necessary to set the focal length $f_F$ of the front lens group to be long, and therefore the interval between the front-side positive lens and the rear-side positive lens inevitably increases. In order to suppress the overall length of the objective lens in a condition where the interval is large, it becomes necessary to set the eye relief to be short, and thereby it becomes difficult to secure an appropriate back focus.

When $f_{RP}/f$ gets smaller than the lower limit of the condition (2), an excessively large power is assigned to the rear-side positive lens, and thereby it becomes impossible to suppress the deviated curvature of field due to a positional error of installation of the rear-side positive lens. Although in this case the overall length can be suppressed as a result of the reduced interval between the front-side positive lens and the rear-side positive lens, it becomes necessary to assign an excessively large power to the front lens group, and therefore it becomes difficult to suitably suppress a coma and distortion caused by the front lens group.

In order to further suppress the deviated curvature of field, in at least one aspect, an object side surface of the front-side positive lens may be a convex surface formed to be an aspherical surface. In this case, the objective lens may satisfy a condition:

$$-1.5 \leq f_{FP}/f_F \leq -0.5 \quad (3)$$

where $f_{FP}$ (unit: mm) represents a focal length of the front-side positive lens.

When $f_{FP}/f_F$ gets larger than the upper limit of the condition (3), it becomes necessary to assign an excessively large power to an object side surface of the front-side positive lens, and therefore it becomes difficult to suppress the deviated curvature of field due to a positional error of installation of the front-side positive lens.

When $f_{FP}/f_F$ gets smaller than the lower limit of the condition (3), an excessively large power is assigned to the front-side negative lens, and therefore the deviated curvature of field due to a positional error of installation of the front lens group becomes large. Furthermore, as a result of reduction of the power of the front-side positive lens, it becomes necessary to increase the magnification of the rear lens group. In this case, the focal length f of the entire optical system tends to easily change depending on the change of the interval between the front-side positive lens and the rear-side positive lens. That is, change of the angle of view becomes large.

In order to further suppress the deviated curvature of field, in at least one aspect, an image side surface of the rear-side positive lens may be a convex surface formed to be an aspherical surface. In this case, the objective lens may satisfy a condition:

$$-0.9 \leq f_{RP}/f_F \leq -0.4 \quad (4)$$

where $f_{RP}$ (unit: mm) represents a focal length of the rear-side positive lens.

When $f_{RP}/f_F$ gets larger than the upper limit of the condition (4), an excessively large power is assigned to the rear-side positive lens, and therefore it becomes difficult to suppress the deviated curvature of field due to a positional error of installation of the rear-side positive lens. Furthermore, the eye relief becomes short in accordance with increase of the power of the rear-side positive lens, and therefore it becomes difficult to secure an appropriate back focus. In order to secure the eye relief, it becomes necessary, for example, to set the curvature of the cementing surface of the cemented lens to be large. In this case, it becomes difficult to process the cemented lens (namely, the positive lens).

When $f_{RP}/f_F$ gets smaller than the lower limit of the condition (4), it becomes necessary to assign a substantial power to the front lens group, and therefore it becomes difficult to suppress the deviated curvature of field due to a positional error of installation of the front lens group. Furthermore, in this case it is necessary to set the magnification of the rear lens group to be large, and therefore change of the magnification of the rear lens group in accordance with change of the interval between the front-side positive lens and the rear-side positive lens becomes large. In this case, a large amount of change of the magnification of the rear lens group occurs, and therefore the angle of view of the objective lens changes largely.

In at least one aspect, an image side surface of the front-side negative lens may be formed to be a concave surface, and the front-side positive lens may be configured such that an object side surface thereof is a convex surface and an image side surface thereof is a flat surface. Since the image side surface of the front-side positive lens is a flat surface, change of the angle of view can be further suppressed.

In at least one aspect, the rear-side positive lens may be configured such that an object side surface thereof is one of a flat surface and a concave surface and an image side surface thereof is a convex surface, and the negative lens of the cemented lens may be a negative meniscus lens whose object side surface is formed to be a convex surface.

In order to further suppress the coma and distortion, in at least one aspect, the objective lens may satisfy a condition:

$$0.2 \leq D_F/D_R \leq 0.5 \quad (5).$$

where $D_F$ (unit: mm) represents a distance in air from an object side surface of the front-side positive lens to a surface of the aperture stop, and $D_R$ (unit: mm) represents a distance in air from the surface of the aperture stop to an image side surface of the rear-side positive lens.

When $D_F/D_R$ gets larger than the upper limit of the condition (5), the height of the light ray to the front-side positive lens becomes too high, and therefore it becomes difficult to control the coma. Furthermore, it becomes difficult to suppress the deviated curvature of field due to a positional error of installation of the front-side positive lens.

When $D_F/D_R$ gets smaller than the lower limit of the condition (5), the height of the light ray to the rear-side positive lens becomes too high, and therefore it becomes difficult to suppress the deviated curvature of field due to a positional error of installation of the rear-side positive lens or the front lens group while considering correction of the distortion.

In at least one aspect, the objective lens may have an angle of view larger than or equal to 130°.

BRIEF DESCRIPTION OF THE ACCOMPANYING DRAWINGS

FIG. 4 is a graph illustrating the chromatic difference of magnification of the objective lens according to the first example of the invention.

FIG. 5 is a graph illustrating the astigmatism of the objective lens according to the first example of the invention.

FIG. 6 is a graph illustrating the distortion of the objective lens according to the first example of the invention.

FIG. 9 is a graph illustrating the chromatic difference of magnification of the objective lens according to the second example of the invention.

FIG. 10 is a graph illustrating the astigmatism of the objective lens according to the second example of the invention.

FIG. 11 is a graph illustrating the distortion of the objective lens according to the second example of the invention.

FIG. 14 is a graph illustrating the chromatic difference of magnification of the objective lens according to the third example of the invention.

FIG. 15 is a graph illustrating the astigmatism of the objective lens according to the third example of the invention.

FIG. 16 is a graph illustrating the distortion of the objective lens according to the third example of the invention.

FIG. 19 is a graph illustrating the chromatic difference of magnification of the objective lens according to the fourth example of the invention.

FIG. 20 is a graph illustrating the astigmatism of the objective lens according to the fourth example of the invention.

FIG. 21 is a graph illustrating the distortion of the objective lens according to the fourth example of the invention.

DETAILED DESCRIPTION OF THE EMBODIMENTS

Hereinafter, an embodiment according to the invention is described with reference to the accompanying drawings.

Figure 1:
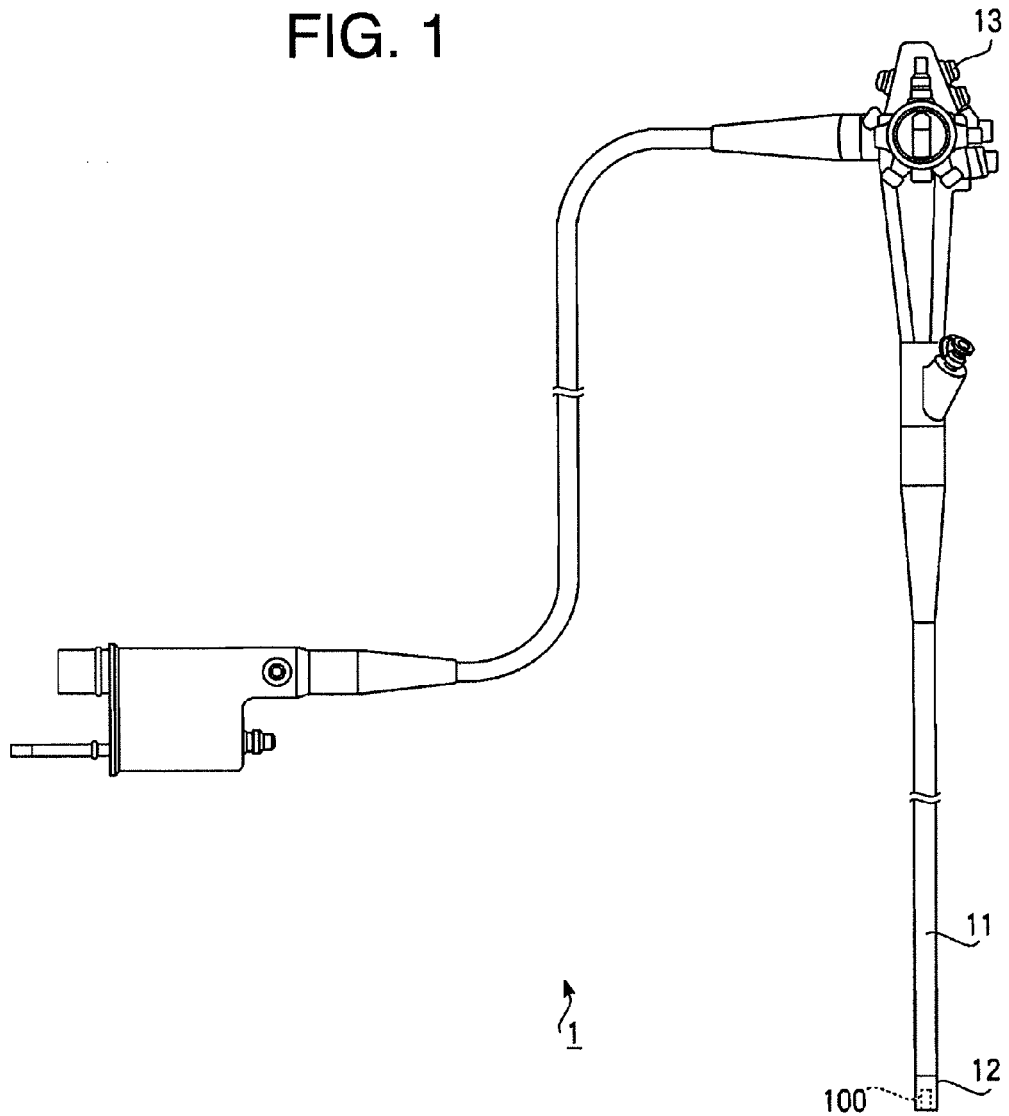
FIG. 1 illustrates an outer appearance of an electronic endoscope according to an embodiment of the invention.

FIG. 1 illustrates an outer appearance of an electronic endoscope 1 according to the embodiment. As shown in FIG. 1, the electronic endoscope 1 has an elastic insertion unit 11 covered with an elastic insertion tube. At a tip of the elastic insertion unit 11, an insertion tip part 12 covered with a resin casing having rigidity is connected. A joint part of the elastic insertion unit 11 and the insertion tip part 12 is formed to be freely deformable through a remote control from an operation unit 13 connected to a proximal end of the elastic insertion unit 11. By deforming the joint part through the remote control from the operation unit 13 and thereby changing the direction of the insertion tip part 12, an imaging area of the electronic endoscope 1 can be moved.

In the inside of the resin casing of the insertion tip part 12, an objective lens for an endoscope (hereafter, simply referred to as an objective lens) 100 is installed. The objective lens 100 converges scattered light from a subject onto a light-receptive surface of a solid-state imaging device (not shown) so that image data of the subject in the imaging area can be obtained.

The objective lens 100 is designed to be compact in size so that the objective lens 100 can be installed in a limited space in the resin casing of the insertion tip part 12. Furthermore, the objective lens 100 may be designed to have, for example, an angle of view larger than or equal to 100° (which is equivalent to ±50° defined with respect to an optical axis AX of the objective lens 100 (see FIG. 2)) so that an observation field can be increased and thereby an affected area can be found easily. When the electronic endoscope 1 is configured to be a digestive endoscope, the objective lens 100 is designed to have an angle of view larger than or equal to 130°, and preferably the objective lens 100 is designed to have an angle of approximately 140°.

Figures 2, 3:
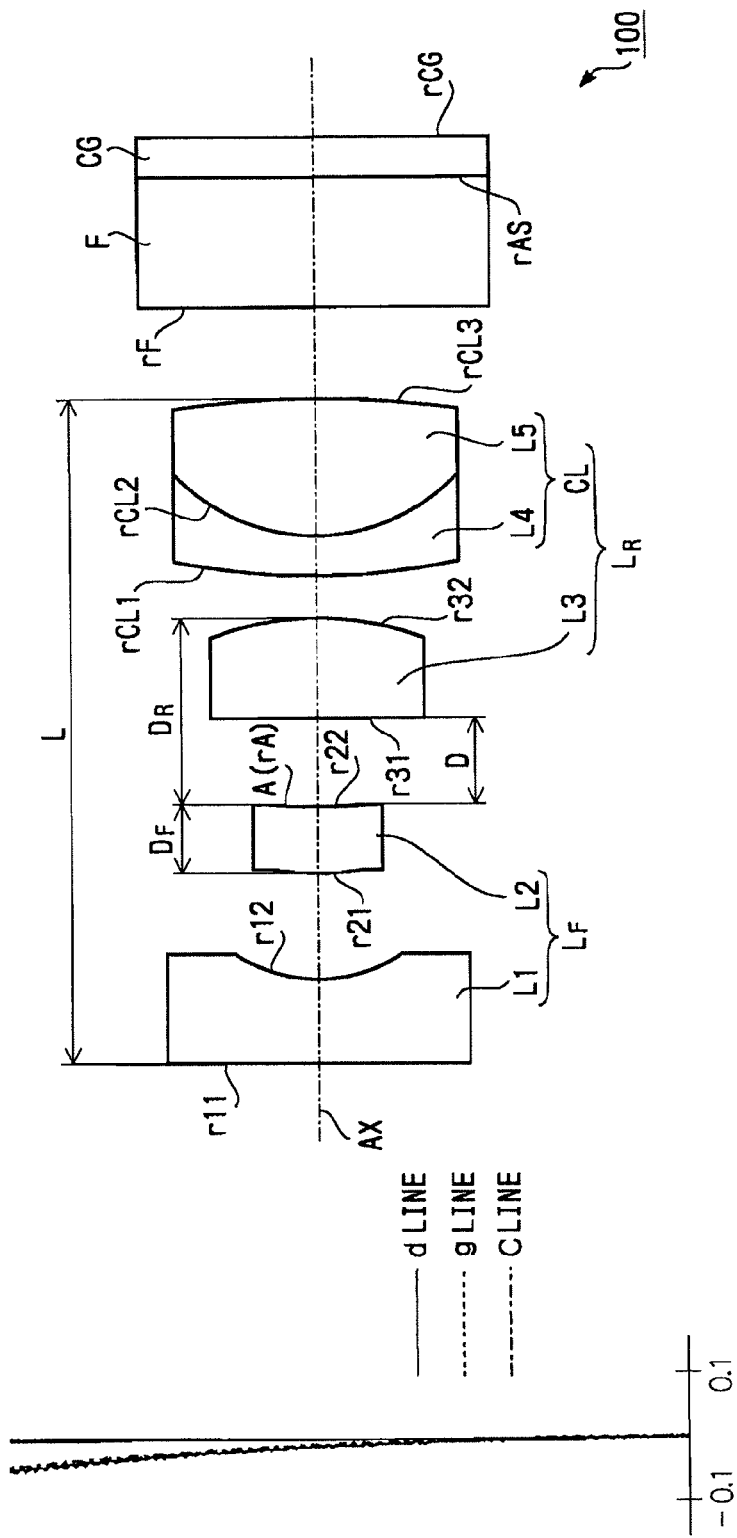
FIG. 2 is a side view illustrating an arrangement of an objective lens for an endoscope according to the embodiment (first example) of the invention and optical components located on the rear side of the objective lens.
FIG. 3 is a graph illustrating the spherical aberration and the axial chromatic aberration of the objective lens according to a first example of the invention.

FIG. 2 is a side view illustrating an example ($1^{st}$ Example which is described later) of an arrangement of the objective lens 100 and optical components located on the rear side of the objective lens 100. In the following, the objective lens 100 according to the embodiment is explained with reference to FIG. 2.

As shown in FIG. 2, at a predetermined position in the objective lens 100, an aperture stop A is arranged. In this specification, a lens group located on the object side with respect to the aperture stop A is referred to as a front lens group $L_F$, and a lens group located on the rear side with respect to the aperture stop A is referred to as a rear lens group $L_R$.

The objective lens 100 includes the front lens group $L_F$ and the rear lens group $L_R$ arranged in this order from the object side. The front lens group $L_F$ includes a negative lens L1 and a positive lens L2 arranged in this order from the object side. The negative lens L1 has a concave surface directed to the image side, and the positive lens L2 has a convex surface directed to the object side. The front lens group $L_F$ is configured to have totally a negative power so as to increase the angle of view of the objective lens 100 (i.e., to obtain a subject over a wide field range).

The rear lens group $L_R$ is arranged on the rear side of the front lens group $L_F$ with respect to the aperture stop A. The rear lens group $L_R$ includes a positive lens L3 and a cemented lens CL arranged in this order from the object side. The cemented lens CL is configured by cementing together a negative lens L4 and a positive lens L5. The rear lens group $L_R$ is configured to have totally a positive power so that the subject obtained by the front lens group $L_F$ over the wide field range can be converged on the light-receptive surface of the solid-state imaging device.

Each of optical lenses configuring the front lens group $L_F$ and the rear lens group $L_R$ has a shape which is rotationally-symmetrical about the optical axis AX of the objective lens 100. On the rear side of the rear lens group $L_R$, a color correction filter F for the solid-state imaging device is located. The color correction filer F is adhered to a cover glass CG which protects the solid-state imaging device.

In the following, an object side surface and an image side surface of each of the optical lenses are represented as a first surface and a second surface, respectively, for convenience of explanation. As shown in FIG. 2, reference symbols r11 and r12 are respectively assigned to a first surface and a second surface of the negative objective lens L1. Further, reference symbols r21 and r22 are respectively assigned to a first surface and a second surface of the positive lens L2, reference symbols r31 and r32 are respectively assigned a first surface and a second surface of the positive lens L3, and reference symbols rCL1, rCL2 and rCL3 are respectively assigned to a first surface, a cementing surface and a second surface of the cemented lens CL. Furthermore, a reference symbol rF is assigned to a first surface of the color correction filer F, rAS is assigned to a cementing surface between the color correction filter F and the cover glass CG, and a reference symbol rCG is assigned to a second surface of the cover glass CG. A symbol rA is assigned to a surface (a position) of the aperture stop A.

The aperture stop A is a plate-like member having a circular opening whose center is located at a position corresponding to the optical axis AX. The aperture stop A may be formed as a shielding layer which is formed to cover a part of the second surface r22 of the positive lens L2 other than an area of the circular opening. The thickness of the aperture stop A is considerably smaller than the thickness of each optical lens, such as the negative lens L1 and the positive lens L2, and can be neglected in regard to calculation of the optical performance of the objective lens 100. In addition, the thickness of the aperture stop A has almost no impact on determination of a design overall length L of the objective lens 100. Therefore, in this embodiment, the thickness of the aperture stop A is regarded as zero. As shown in FIG. 2, the overall length L of the objective lens 100 is defined as a distance from the first surface r11 of the negative objective lens L1 and the second surface rCL3 of the cemented lens CL.

In order to downsize the objective lens 100, it is preferable to shorten the overall length L by decreasing a group interval D (unit: mm) between the front lens group $L_F$ and the rear lens group $L_R$. In this case, the group interval D is defined as a distance from the second surface r22 of the positive lens L2 and the first surface r31 of the positive lens L3. In order to decrease the group interval D, it is necessary to set an angle of a light ray incident on the aperture stop A (or an angle of a light lay exiting from the aperture stop A) to be large by assigning a considerable power to a particular lens (e.g., the positive lens L3). However, as compensation for such a configuration, when the particular lens to which a considerable power is assigned has a thickness error or an assembling error, the angular change of the light ray becomes large, thereby causing further change of the angle of view and change of the curvature of field. Regarding the assembling error, there are concerns that the change of the curvature of field occurs largely when an axis of the front lens group $L_F$ or the rear lens group $L_R$ shifts with respect to the optical axis AX.

Figure 22A:
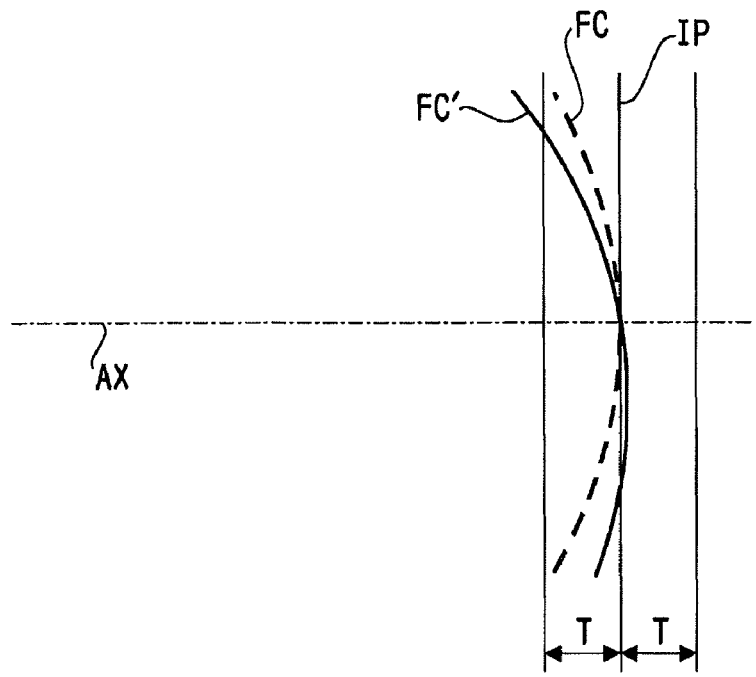
FIGS. 22A and 22B are explanatory illustrations for explaining change of the curvature of field to be suppressed in accordance with the embodiment of the invention.
Figure 22B:
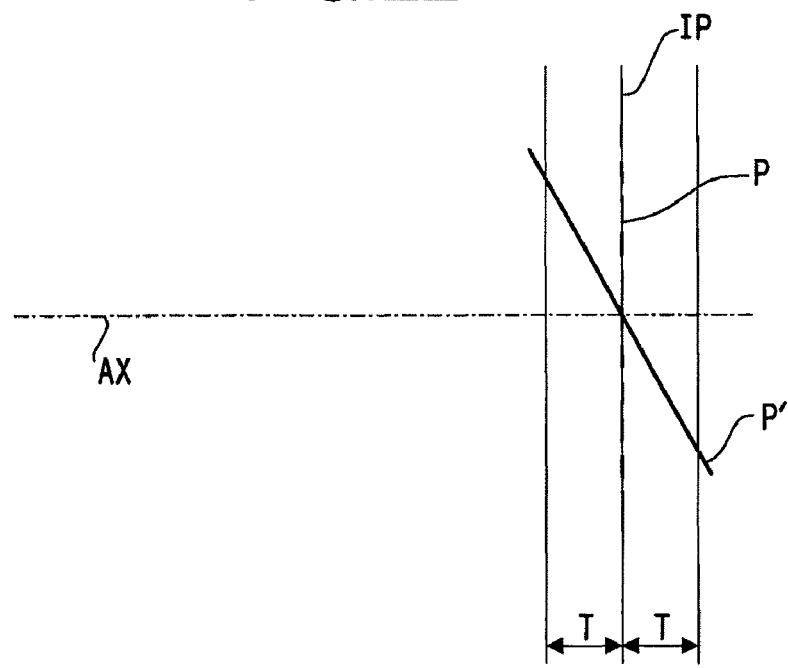

FIGS. 22A and 22B are explanatory illustrations for explaining change of the curvature of field to be suppressed in accordance with the embodiment of the invention. Specifically, FIG. 22A is a graph illustrating a situation where the curvature of field is caused, and FIG. 22B is a graph illustrating a situation where the curvature of field has been corrected completely. In FIGS. 22A and 22B, reference symbols IP, FC and P respectively represent an ideal image plane, a curved plane formed by a general lens for which aberrations are corrected, and an image plane formed by an ideal imaging lens for which the curvature of field is corrected completely. The image plane P is identical with the image plane IP.

As shown in FIG. 22A, in general, the curvature of field can not be removed completely even if a lens for which aberrations are corrected is used. However, regarding a lens for which aberrations are corrected, the remaining curvature of field is suppressed to an amount lower than or equal to a permissible amount T. Therefore, the peripheral resolution satisfying the required specification can be achieved.

A reference symbol P' in FIG. 22B represents an image plane formed when an ideal imaging lens for which the curvature of field is corrected completely is installed in the state where the ideal imaging lens shifts from a reference position (i.e., the optical axis AX in this embodiment). As shown in FIG. 22B, the image surface P' is inclined with respect to the optical axis AX depending on the shifting amount and the shifting direction caused during assembling of the ideal imaging lens. When the assembling error of the imaging lens is large, a deviation between the image plane P' and the ideal image plane IP exceeds the permissible amount T, and thereby the resolution deteriorates.

In FIG. 22A, a reference symbol FC' represents an image plane formed when a general imaging lens for which aberrations are corrected is installed in the state where the general imaging lens shifts from a reference position (i.e., the optical axis AX in this embodiment). In this case, although the total amount of the curvature of field is substantially equal to the total amount of the curvature of field of the image plane FC (i.e., the curvature of field caused when no assembling error is caused), the curvature of field remains in an asymmetrical condition with respect to the optical axis AX depending on the shifting amount and the shifting direction of the imaging lens caused during assembling of the imaging lens as in the case of the image plane P' shown in FIG. 22B. As a result, as shown in FIG. 22A, the curvature of the field exceeding the permissible amount T remains at a part of a peripheral area, and thereby a problem arises that the resolution is deteriorated at the part of the peripheral area. Hereafter, the curvature of field changed to remain in the asymmetrical condition with respect to the optical axis is referred to a "deviated curvature of field". In a product field of the small size and wide angle of view lenses for endoscopes, a challenge for designers is to suppress the deviated curvature of field without causing a burden concerning the manufacturing management, such as managing of tolerances.

For this reason, when $f_F$ (unit: mm) represents a focal length of the front lens group $L_F$, f (unit: mm) represents a focal length of the entire lens system (i.e., a combination of the front lens group $L_F$ and the rear lens group $L_R$), and $f_{RP}$ (unit: mm) represents a focal length of a lens in the rear lens group $L_R$ closest to the aperture stop A (i.e., the positive lens L3), the objective lens 100 is configured to satisfy the following conditions (1) and (2).

$$-4.5 \leq f_F/f \leq -2.0 \quad (1)$$

$$1.5 \leq f_{RP}/f \leq 2.5 \quad (2)$$

The condition (1) defines a ratio between the focal length $f_F$ of the front lens group $L_F$ and the focal length f of the entire optical system.

When $f_F/f$ gets larger than the upper limit of the condition (1), the front lens group $L_F$ is set to have a low magnification, and therefore the deviated curvature of field due to deviation of the front lens group $L_F$ can be suppressed. However, in this case change of magnification of the rear lens group $L_R$ due to change of the group interval D caused by an assembling error or a thickness error of the lenses in the neighborhood of the aperture stop A can not be suppressed, and thereby change of the angle of view becomes large. As a result, the angle of view satisfying the specification can not be secured.

When $f_F/f$ gets smaller than the lower limit of the condition (1), change of magnification of the rear lens group $L_F$ due to change of the group interval D can be suppressed, and therefore the change of the angle of view becomes small. However, in this case, it becomes necessary to set the magnification of the front lens group $L_F$ to be large, and thereby it becomes impossible to suppress the deviated curvature of field caused by deviation of the front lens group $L_F$.

The condition (2) defines a ratio between the focal length $f_{RP}$ of the positive lens L3 and the focal length f of the entire optical system.

When $f_{RP}/f$ gets larger than the upper limit of the condition (2), the amount of assigned power of the positive lens L3 can be reduced, and thereby the deviated curvature of field due to deviation of the lens L3 can be suppressed. However, in this case, it becomes necessary to assign a relatively large magnification to the front lens group $L_F$, and thereby it becomes impossible to suppress the deviated curvature of field due to deviation of the front lens group $L_F$. In another aspect, it becomes necessary to set the focal length $f_F$ of the front lens group $L_F$ to be long, and therefore the group interval D inevitably increases. In order to suppress the overall length L in a condition where the group interval D is large, it becomes necessary to set the eye relief to be short, and thereby it becomes difficult to secure an appropriate back focus.

When $f_{RP}/f$ gets smaller than the lower limit of the condition (2), an excessively large power is assigned to the positive lens L3, and thereby it becomes impossible to suppress the deviated curvature of field due to deviation of the lens L3. Although in this case the overall length L can be suppressed as a result of the reduced group interval D, it becomes necessary to assign an excessively large power to the front lens group $L_F$, and therefore it becomes difficult to suitably suppress a coma and distortion caused by the front lens group $L_F$.

When both of the conditions (1) and (2) are satisfied simultaneously, it becomes possible to set the front lens group $L_F$ to have a low magnification and to set the power of the positive lens L3 to be weak, and thereby it becomes possible to suitably suppress the deviated curvature of field caused when an assembling deviation error is caused. Furthermore, the change of magnification of the rear lens group $L_R$ due to change of the group interval D can be suppressed, and the change of the angle of view of the objective lens 100 becomes hard to occur. Furthermore, since the focal length of the front lens group $L_F$ is set to be short, the overall length L can also be suppressed by reducing the group interval D.

In order to suppress change of the angle of view, the objective lens 100 is required to assign a certain degree of power to the positive lens L2. Therefore, there are concerns that the front lens group $L_F$ causes aberrations. In order to correct the aberrations and thereby to enhance the optical performance of the objective lens 100, it is preferable to form at least one of the lens surfaces of the front lens group $L_F$ to be an aspherical surface. In this embodiment, an optimal lens surface of the lens surfaces in the front lens group $L_F$ to be formed as an aspherical surface is the first surface r21 of the positive lens L2 (i.e., a first surface of a lens closest to the aperture stop A in the first lens group $L_F$). Specifically, the first surface r21 is designed such that the power becomes stronger (i.e., the curvature radius becomes smaller) at a point father from the optical axis of the positive lens L2, and that, at a position corresponding to the effective diameter, a sag amount of the aspherical surface increases by 0.2-0.4% with respect to a sag amount of a spherical surface having an axial curvature radius. By the aspherical surface, a coma caused by the positive lens L2 can be suitably corrected. At the same time, since the distortion is not corrected excessively, decrease of an image surface illuminance ratio can be avoided effectively. Furthermore, since the chromatic difference of magnification is not corrected excessively, deterioration of the peripheral resolution can be suppressed effectively.

A shape of an aspherical surface is expressed by a following equation:

$$X(h) = \frac{Ch^2}{1+\sqrt{1-(1+\kappa)C^2h^2}} + \sum_{i=2} A_{2i}h^{2i}$$

where, X(h) is a distance (a sag amount) between a point on the aspherical surface at a height of h (unit: mm) from the optical axis and a plane tangential to the aspherical surface at the optical axis, C is a curvature of the aspherical surface on the optical axis (i.e., C is 1/r (where r represents a curvature radius of the aspherical surface on the optical axis), κ is a conical coefficient, and $A_{2i}$ (i: an integer larger than or equal to 2) represents aspherical coefficients larger than or equal to the $4^{th}$ order.

The objective lens 100 is configured such that first surface r21 of the positive lens L2 is formed to be an aspherical surface as described above, and that the objective lens 100 satisfies a condition:

$$-1.5 \leq f_{FP}/f_F \leq -0.5 \tag{3}$$

where $f_{FP}$ (unit: mm) represents the focal length of the positive lens L2.

The condition (3) defines a ratio between the focal length $f_{FP}$ of the positive lens L2 and the focal length $f_F$ of the front lens group $L_F$. By satisfying the condition (3), the power assigned to the first surface r21 of the positive lens L2 can be reduced. Therefore, it becomes possible to suppress the deviated curvature of field due to deviation of the positive lens L2.

When $f_{FP}/f_F$ gets larger than the upper limit of the condition (3), it becomes necessary to assign an excessively large power to the first surface r21 of the positive lens L2, and therefore it becomes difficult to suppress the deviated curvature of field due to deviation of the positive lens L2.

When $f_{FP}/f_F$ gets smaller than the lower limit of the condition (3), an excessively large power is assigned to the negative lens L1, and therefore the deviated curvature of field due to deviation of the front lens group $L_F$ becomes large. Furthermore, as a result of reduction of the power of the positive lens L2, it becomes necessary to increase the magnification of the rear lens group $L_R$. In this case, the focal length f of the entire optical system tends to easily change depending on the change of the group interval D. That is, change of the angle of view becomes large.

Since the objective lens 100 needs to assign a certain amount of power to the positive lens L3 to suppress the deviated curvature of field, there are concerns about the aberrations caused by the rear lens group $L_R$. In order to enhance the optical performance of the objective lens 100 by correcting the aberrations, it is preferable to form at least one of the lens surfaces of the rear lens group $L_R$ to be an asphericla surface. In this embodiment, an optimal surface to be formed as an aspherical surface in the rear lens group $L_R$ is the second surface r32 of the positive lens L3 (i.e., a lens closest to the aperture stop A in the rear lens group $L_R$). Specifically, the second surface r32 is designed such that the power becomes weaker (i.e., the curvature radius becomes larger) at a point father from the optical axis of the positive lens L3, and that, at a position corresponding to the effective diameter, a sag amount of the aspherical surface decreases by 0.3-1.4% with respect to a sag amount of a spherical surface having an axial curvature radius. By the aspherical surface, the spherical aberration caused by the positive lens L3 can be corrected, and the excessive correction of the distortion can be avoided, while suppressing the deviated curvature of field due to deviation of the positive lens L3. It should be noted that the aspherical surface of the second surface r32 can also be defined by the above described expression.

The objective lens 100 is configured such that the second surface r32 of the positive lens L3 is formed to be an aspherical surface as described above, and that the objective lens 100 satisfies a condition:

$$-0.9 \leq f_{RP}/f_F \leq -0.4 \tag{4}$$

where $f_{RP}$ (unit: mm) represents the focal length of the positive lens L3.

The condition (4) defines a ratio between the focal length $f_{RP}$ of the positive lens L3 and the focal length $f_F$ of the front lens group $L_F$. By satisfying the condition (4), the power assigned to the positive lens L3 is reduced, and therefore the deviated curvature of field due to deviation of the positive lens L3 can be suppressed further. Furthermore, since the power assigned to the front lens group $L_F$ can be reduced, the deviated curvature of field due to deviation of the front lens group $L_F$ can also be suppressed further.

When $f_{RP}/f_F$ gets larger than the upper limit of the condition (4), an excessively large power is assigned to the positive lens L3, and therefore it becomes difficult to suppress the deviated curvature of field due to deviation of the positive lens L3. Furthermore, the eye relief becomes short in accordance with increase of the power of the positive lens L3, and therefore it becomes difficult to secure an appropriate back focus. In order to secure the eye relief, it becomes necessary, for example, to set the curvature of the cementing surface rCL2 of the cemented lens CL to be large. In this case, it becomes difficult to process the cemented lens CL, namely the positive lens L5.

When $f_{RP}/f_F$ gets smaller than the lower limit of the condition (4), it becomes necessary to assign a substantial power to the front lens group $L_F$, and therefore it becomes difficult to suppress the deviated curvature of field due to deviation of the front lens group $L_F$. Furthermore, in this case it is necessary to set the magnification of the rear lens group $L_R$ to be large, and therefore change of the magnification of the rear lens group $L_R$ in accordance with change of the group interval D due to a thickness error of the positive lens L3 and etc. becomes large. In this case, a large amount of change of the magnification of the rear lens group $L_R$ occurs, and therefore the angle of view of the objective lens 100 changes largely.

The second surface r22 of the positive lens L2 is formed to be a flat shape to reduce change of the magnification of the rear lens group $L_R$ due to change of the thickness of the positive lens L2 (i.e., change of the angle of view).

The first surface r31 of the positive lens L3 is formed to be one of a flat surface or a concave surface. When the first surface r31 is formed to be a flat surface, the effect of further suppressing the change of the magnification of the rear lens group $L_R$ (i.e., change of the angle of view) caused by change of the group interval D due to a thickness error of the positive lens L3 and etc. can be realized. When the first surface r31 is formed to be a concave surface, the angular change of the off-axis light ray can be suppressed, and therefore the deviated curvature of field due to deviation can be suppressed.

The negative lens L4 is a negative meniscus lens whose first surface rCL1 is formed to be a convex shape. In this case, since the angular change of the off-axis light ray becomes small, the deviated curvature of field due to deviation of the negative lens L4 can be suppressed. Furthermore, since the negative lens and the positive lens are cemented together, the chromatic aberration can be suitably corrected while suppressing increase of the overall length L.

When $D_F$ (unit: mm) represents a distance in air from the first surface r21 of the positive lens L2 to the aperture stop, and $D_R$ (unit: mm) represents a distance in air from the aperture stop A to the positive lens L3, the objective lens 100 satisfies a condition:

$$0.2 \leq D_F/D_R \leq 0.5 \tag{5}$$

The condition (5) defines the position of the aperture stop A. By satisfying the condition (5), the height of the incident light ray to the positive lens L2 or L3 can be suppressed while suppressing the deviated curvature of field due to deviation of the positive lens L2 or L3. Consequently, a coma caused by the power of the positive lens L2 can be suitably suppressed without excessively correcting the distortion.

When $D_F/D_R$ gets larger than the upper limit of the condition (5), the height of the light ray to the positive lens L2 becomes too high, and therefore it becomes difficult to control the coma and to suppress the deviated curvature of field due to deviation of the positive lens L2.

When $D_F/D_R$ gets smaller than the lower limit of the condition (5), the height of the light ray to the positive lens L3 becomes too high, and therefore it becomes difficult to suppress the deviated curvature of field due to deviation of the positive lens L3 or the front lens group $L_F$ while considering correction of the distortion.

In the following, four concrete numerical examples (first to fourth Examples) of the objective lens 100 are explained. In each of the first to fourth examples, the objective lens 100 is located at the insertion tip part 12 of the electronic endoscope 1. Common specifications (F number FNo, the overall focal length f (unit: mm), the magnification m) of the first to fourth examples are as follows.

FNo: 5.6
f: 1.000
m: −0.080

Since the half angle of view ω (unit: deg) and the image height y (unit: mm) are differently defined respectively for the first to fourth examples, the half angle of view ω and the image height y are described with explanations of configurations of the first to fourth examples.

FIRST EXAMPLE

As described above, FIG. 2 shows the configuration of the objective lens 100 according to a first example of the invention. Table 1 shows a concrete numerical configuration (design values) of the objective lens 100 according to the first example and the optical components arranged on the rear side of the objective lens 100. In Table 1 (and in the following similar tables), r (unit: mm) denotes an curvature radius of a surface of each optical component, d (unit: mm) denotes the thickness of an optical component or the distance (unit: mm) from each optical surface to the next optical surface, "Nd" denotes a refractive index at a d-line (a wavelength of 588 nm), and vd denotes Abbe number at the d-line. "r" of an aspherical element is a curvature radius defined on the optical axis AX. In Table 1, the surfaces #1 and #2 respectively denote the first surface r11 and the second surface r22 of the negative lens L1, surfaces #3 and #4 respectively denote the first surface r21 and the second surface 22 of the positive lens L2, surface #5 denotes the surface rA of the aperture stop A, and surfaces #6 and #7 respectively denote the first surface r31 and the second surface r32 of the positive lens L3. Further, surfaces #8, #9 and #10 respectively denote the first surface rCL1, the cementing surface rCL2 and the second surface rCL3, and surfaces #11, #12 and #13 respectively denote the first surface rF of the color correction filer, the cementing surface rAS between the color correction filter F and the cover glass CG, and the second surface rCG of the cover glass CG.

ω: 70.1
y: 1.06

TABLE 1

| Surface No. | r | d | Nd | vd |
| --- | --- | --- | --- | --- |
| 1 | ∞ | 0.522 | 1.88300 | 40.8 |
| 2 | 0.846 | 0.705 | — | — |
| 3 | 1.918 | 0.422 | 1.86400 | 40.6 |
| 4 | ∞ | 0.000 | — | — |
| 5 | ∞ | 0.560 | — | — |
| 6 | ∞ | 0.624 | 1.86400 | 40.6 |
| 7 | −1.862 | 0.275 | — | — |
| 8 | 4.049 | 0.248 | 1.92286 | 18.9 |
| 9 | 1.146 | 0.900 | 1.77250 | 49.6 |
| 10 | −8.260 | 0.598 | — | — |
| 11 | ∞ | 0.828 | 1.51633 | 64.2 |
| 12 | ∞ | 0.248 | 1.51000 | 64.1 |
| 13 | ∞ | — | — | — |

Each of the first surface r21 of the positive lens L2 and the second surface r32 of the positive lens L3 is an aspherical surface. The following Table 2 shows the conical coefficients κ and aspherical coefficients $A_4$, $A_6$ . . . of each aspherical surface. In Table 2 (and in the following similar Tables), the notation "E" means the power of 10 with an exponent specified by the number to the right of E (e.g. "E−04" means "$\times 10^{-4}$").

TABLE 2

| Surface No. | κ | A4 | A6 | A8 |
| --- | --- | --- | --- | --- |
| 3 | 0.000 | 0.8779E−01 | 0.1387E+01 | −0.7834E+01 |
| 7 | 0.000 | 0.3655E−01 | −0.2360E−01 | 0.2326E−01 |

FIGS. 3 to 6 are graphs illustrating the aberrations caused by the objective lens 100 according to the first example. Specifically, FIG. 3 is a graph illustrating the spherical aberration and the axial chromatic aberration at d-line, g-line and C-line. FIG. 4 is a graph illustrating the chromatic difference of magnification at d-line, g-line and C-line. In each of FIGS. 3 and 4, a curve indicated by a solid line represents aberration at d-line, a curve indicated by a dashed line represents aberration at g-line, and a curve indicated by a chain line represents aberration at C-line. FIG. 5 is a graph illustrating astigmatism. In FIG. 5, a curve indicated by a solid line represents a sagittal component and a curve indicated by a dashed line represents a meridional component. FIG. 6 is a graph illustrating the distortion. In each of FIGS. 3-5, the vertical axis represents the image height, and the horizontal axis represents the distortion amount of the image. As shown in FIGS. 3 to 6, in the objective lens 100 according to the first example, the aberrations are suitably corrected. The above described explanation regarding each of FIGS. 3 to 6 also applies to the similar graphs explained below.

SECOND EXAMPLE

Figures 7, 8:
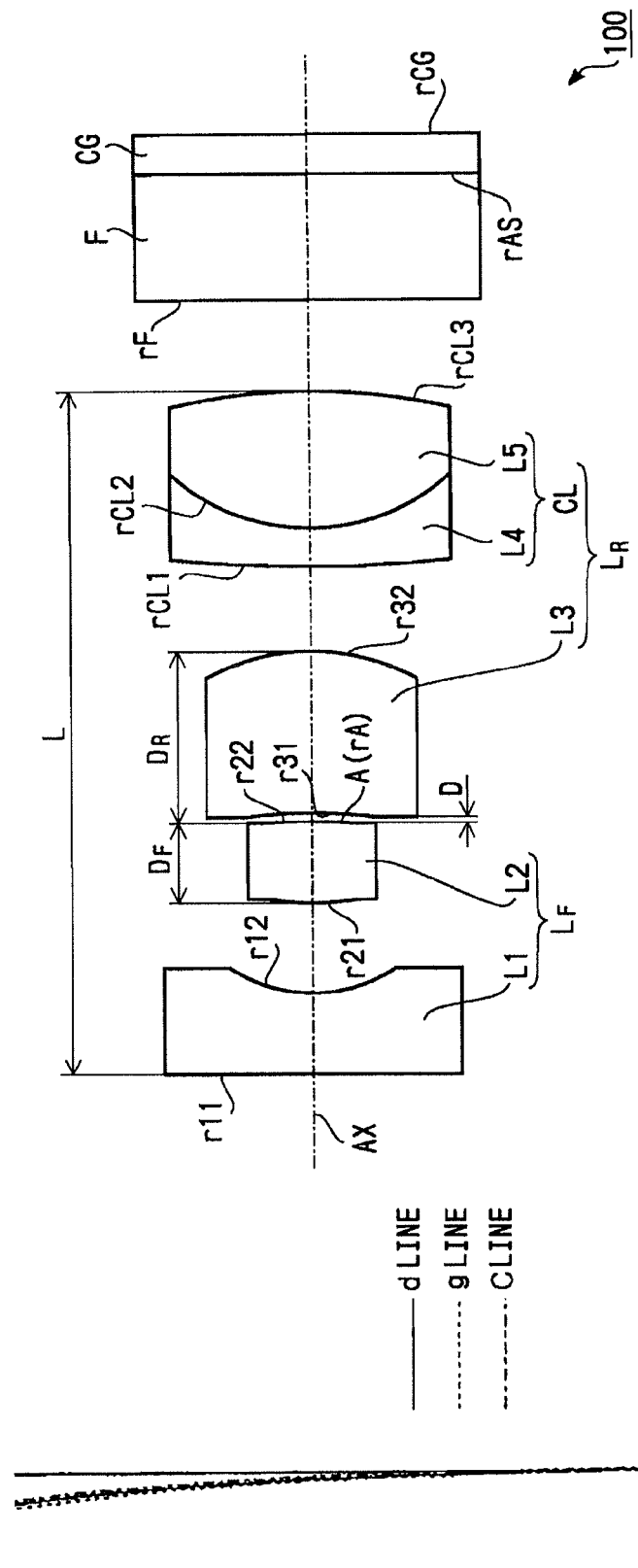
FIG. 7 is a side view illustrating an arrangement of an objective lens for an endoscope according to a second example of the invention and optical components located on the rear side of the objective lens.
FIG. 8 is a graph illustrating the spherical aberration and the axial chromatic aberration of the objective lens according to the second example of the invention.

Hereafter, a second example of the invention is explained. FIG. 7 is a side view illustrating a configuration of the objective lens 100 according to the second example and the optical components arranged on the rear side of the objective lens 100. Table 3 shows the concrete numerical configuration (design values) of the objective lens 100 according to the second example and the optical components arranged on the rear side of the objective lens 100. Table 4 shows the coefficients (design values) defining aspherical surfaces of the first surface r21 of the positive lens L2 and the second surface r32 of the positive lens L3.

ω: 70.0
y: 1.05

TABLE 3

| Surface No. | r | d | Nd | vd |
| --- | --- | --- | --- | --- |
| 1 | ∞ | 0.520 | 1.88300 | 40.8 |
| 2 | 0.886 | 0.613 | — | — |
| 3 | 1.890 | 0.506 | 1.86400 | 40.6 |
| 4 | ∞ | 0.000 | — | — |
| 5 | ∞ | 0.065 | — | — |
| 6 | −2.737 | 1.072 | 1.86400 | 40.6 |
| 7 | −1.236 | 0.570 | — | — |
| 8 | 7.434 | 0.248 | 1.92286 | 18.9 |
| 9 | 1.268 | 0.892 | 1.77250 | 49.6 |
| 10 | −3.687 | 0.606 | — | — |
| 11 | ∞ | 0.825 | 1.51633 | 64.2 |
| 12 | ∞ | 0.248 | 1.51000 | 64.1 |
| 13 | ∞ | — | — | — |

TABLE 4

| Surface No. | κ | A4 | A6 | A8 |
| --- | --- | --- | --- | --- |
| 3 | 0.000 | −0.8855E−02 | 0.2226E+01 | −0.1025E+02 |
| 7 | 0.000 | 0.4491E−01 | −0.1476E+00 | 0.2817E+00 |

FIGS. 8 to 11 are graphs illustrating the aberrations caused by the objective lens 100 according to the second example. FIG. 8 is a graph illustrating the spherical aberration and the axial chromatic aberration of the objective lens 100 according to the second example. FIG. 9 is a graph illustrating the chromatic difference of magnification, FIG. 10 is a graph illustrating the astigmatism, and FIG. 11 is a graph illustrating the distortion. As shown in FIGS. 8 to 11, according to the second example, the aberrations are suitably corrected.

THIRD EXAMPLE

Figures 12, 13:
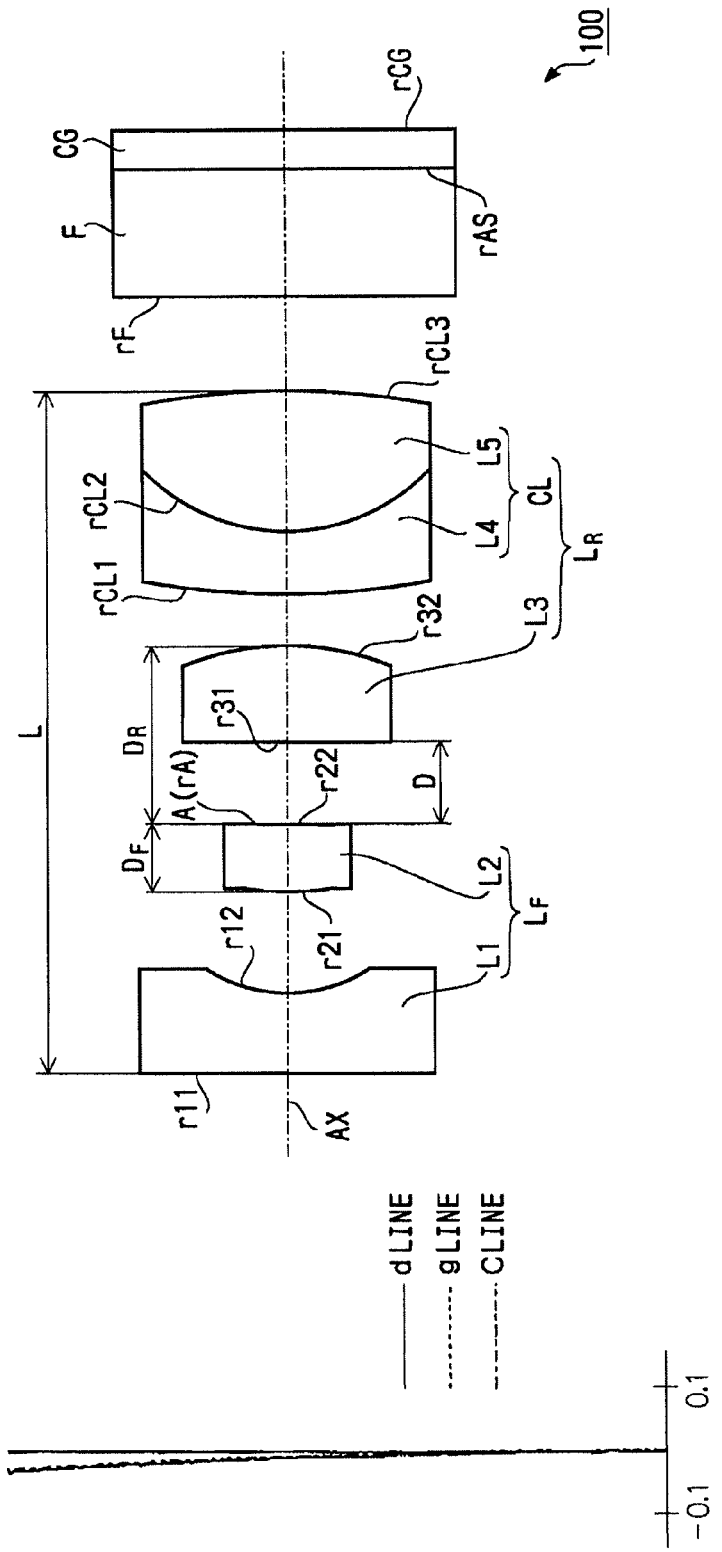
FIG. 12 is a side view illustrating an arrangement of an objective lens for an endoscope according to a third example of the invention and optical components located on the rear side of the objective lens.
FIG. 13 is a graph illustrating the spherical aberration and the axial chromatic aberration of the objective lens according to the third example of the invention.

Hereafter, a third example of the invention is explained. FIG. 12 is a side view illustrating a configuration of the objective lens 100 according to the third example and the optical components arranged on the rear side of the objective lens 100. Table 5 shows the concrete numerical configuration (design values) of the objective lens 100 according to the third example and the optical components arranged on the rear side of the objective lens 100. Table 6 shows the coefficients (design values) defining aspherical surfaces of the first surface r21 of the positive lens L2 and the second surface r32 of the positive lens L3.

ω: 73.3
y: 1.08

TABLE 5

| Surface No. | r | d | Nd | vd |
|---|---|---|---|---|
| 1 | ∞ | 0.519 | 1.88300 | 40.8 |
| 2 | 0.869 | 0.687 | — | — |
| 3 | 2.475 | 0.433 | 1.86400 | 40.6 |
| 4 | ∞ | 0.000 | — | — |
| 5 | ∞ | 0.534 | — | — |
| 6 | ∞ | 0.634 | 1.86400 | 40.6 |
| 7 | −1.696 | 0.349 | — | — |
| 8 | 5.607 | 0.412 | 1.92286 | 18.9 |
| 9 | 1.219 | 0.937 | 1.77250 | 49.6 |
| 10 | −4.703 | 0.646 | — | — |
| 11 | ∞ | 0.824 | 1.51633 | 64.2 |
| 12 | ∞ | 0.247 | 1.51000 | 64.1 |
| 13 | ∞ | — | — | — |

TABLE 6

| Surface No. | κ | A4 | A6 | A8 |
|---|---|---|---|---|
| 3 | 0.000 | 0.1191E+00 | 0.1782E+00 | 0.0000E+00 |
| 7 | 0.000 | 0.4808E−01 | −0.4831E−01 | 0.3964E−01 |

FIGS. 13 to 16 are graphs illustrating the aberrations caused by the objective lens 100 according to the third example. FIG. 13 is a graph illustrating the spherical aberration and the axial chromatic aberration of the objective lens 100 according to the third example. FIG. 14 is a graph illustrating the chromatic difference of magnification, FIG. 15 is a graph illustrating the astigmatism, and FIG. 16 is a graph illustrating the distortion. As shown in FIGS. 13 to 16, according to the second example, the aberrations are suitably corrected.

FOURTH EXAMPLE

Figure 17:
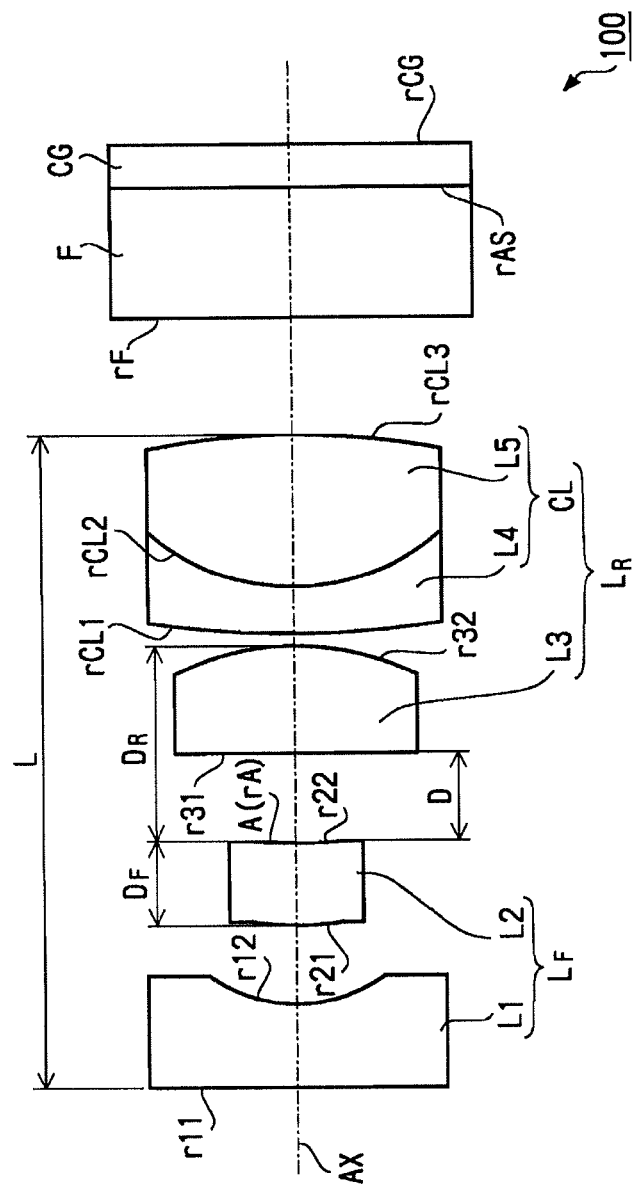
FIG. 17 is a side view illustrating an arrangement of an objective lens for an endoscope according to a fourth example of the invention and optical components located on the rear side of the objective lens.

Hereafter, a fourth example of the invention is explained. FIG. 17 is a side view illustrating a configuration of the objective lens 100 according to the fourth example and the optical components arranged on the rear side of the objective lens 100. Table 7 shows the concrete numerical configuration (design values) of the objective lens 100 according to the fourth example and the optical components arranged on the rear side of the objective lens 100. Table 8 shows the coefficients (design values) defining aspherical surfaces of the first surface r21 of the positive lens L2 and the second surface r32 of the positive lens L3.

ω: 68.3
y: 1.04

TABLE 7

| Surface No. | r | d | Nd | vd |
|---|---|---|---|---|
| 1 | ∞ | 0.522 | 1.88300 | 40.8 |
| 2 | 0.835 | 0.488 | — | — |
| 3 | 2.309 | 0.512 | 1.90200 | 25.1 |
| 4 | ∞ | 0.000 | — | — |
| 5 | ∞ | 0.549 | — | — |
| 6 | ∞ | 0.685 | 1.86400 | 40.6 |
| 7 | −1.507 | 0.066 | — | — |
| 8 | 5.063 | 0.295 | 1.92286 | 18.9 |
| 9 | 1.303 | 0.935 | 1.72916 | 54.7 |
| 10 | −5.506 | 0.758 | — | — |
| 11 | ∞ | 0.828 | 1.51633 | 64.2 |
| 12 | ∞ | 0.248 | 1.51000 | 64.1 |
| 13 | ∞ | — | — | — |

TABLE 8

| Surface No. | κ | A4 | A6 | A8 |
|---|---|---|---|---|
| 3 | 0.000 | 0.8716E−01 | 0.4206E+00 | 0.0000E+00 |
| 7 | 0.000 | 0.3513E−01 | −0.2895E−02 | 0.7798E−02 |

Figure 18:
FIG. 18 is a graph illustrating the spherical aberration and the axial chromatic aberration of the objective lens according to the fourth example of the invention.

FIGS. 18 to 21 are graphs illustrating the aberrations caused by the objective lens 100 according to the fourth example. FIG. 18 is a graph illustrating the spherical aberration and the axial chromatic aberration of the objective lens 100 according to the fourth example. FIG. 19 is a graph illustrating the chromatic difference of magnification, FIG. 20 is a graph illustrating the astigmatism, and FIG. 20 is a graph illustrating the distortion. As shown in FIGS. 18 to 21, according to the second example, the aberrations are suitably corrected.

Table 9 shows values regarding the conditions (1) to (5) for each of the first to fourth examples. As shown in Table 9, all of the first to fourth examples satisfy the conditions (1) to (5). Accordingly, the objective lens 100 according to each of the first to fourth examples is able to suitably suppress change of the angle of view and the deviated curvature of field due to a manufacturing error or an assembling error.

TABLE 9

| | $1^{st}$ Example | $2^{nd}$ Example | $3^{rd}$ Example | $4^{th}$ Example |
|---|---|---|---|---|
| Condition (1) | −3.82 | −3.85 | −2.36 | −2.15 |
| Condition (2) | 2.15 | 1.96 | 1.96 | 1.74 |
| Condition (3) | −0.58 | −0.57 | −1.21 | −1.19 |
| Condition (4) | −0.56 | −0.51 | −0.83 | −0.81 |
| Condition (5) | 0.26 | 0.42 | 0.27 | 0.29 |

Next, the optical performance (change of the angle of view and the changing amount of the curvature of field caused by or the deviated curvature of field, due to a manufacturing error or an assembling error) of the objective lens 100 according to each of the first to fourth examples is verified. For the purpose of verification, Example 6 disclosed in JP2007-249189A and Example 3 disclosed in JP2004-354888A are picked up as comparative examples. In the following, Example 6 disclosed in JP2007-249189A is explained as a comparative example 1 to be compared to the above described first example, and Example 3 disclosed in JP2004-354888A is explained as a comparative example 2 to be compared to the above described third example.

Table 10 shows values of the conditions (1) to (5) of the comparative examples 1 and 2. As shown in Table 10, the comparative example 1 does not satisfy the condition (2) and (4) to (5), and the comparative example 2 does not satisfy the conditions (1) to (5).

TABLE 10

| | Comparative Example 1 | Comparative Example 2 |
|---|---|---|
| Condition (1) | −2.02 | −1.73 |
| Condition (2) | 3.34 | 2.80 |
| Condition (3) | −0.87 | −2.25 |

TABLE 10-continued

|  | Comparative Example 1 | Comparative Example 2 |
|---|---|---|
| Condition (4) | −1.66 | −1.61 |
| Condition (5) | 0.86 | 1.17 |

Let us consider change of the angle of view caused when one of a lens thickness of one of the lenses in the neighborhood of the aperture A and an interval between the lenses in the neighborhood of the aperture A has an error of +0.1 mm in the second example and the comparative example 1. When the lens thickness of the positive lens L2, the lens thickness of the positive lens L3 and the group interval D have an error of +0.1 mm in the second example, the changing amounts of the angles of view are 0.2°, 3.4° and 0.5°, respectively. That is, regarding the objective lens 100 according to the second example, the changing amounts of the angles of view are suppressed to a small level, and therefore the high optical performance can be secured. In particular, the changing amounts of the angles of view caused by the thickness error of the positive lens L2 and an error of the group interval D are suppressed to a considerably small level, and therefore the tolerance to the manufacturing error is high. When a standard level defined in JIS (Japanese Industrial standard) is considered, it is preferable to decrease the changing amount of the angle of view to a value lower than or equal to ±15%. In this regard, according to the second example, the changing amount of the angle of view of the entire objective lens 100 is suppressed to a value sufficiently lower than the standard level defined in JIS by suppressing the changing amount of the angle of view with respect to an error of 0.1 mm to 4.0° for each of the lens thickness of the positive lens L2, the lens thickness of the positive lens L3, and the group interval D.

When each of the lens thickness of the lens on the front side of the aperture A, the lens thickness of the lens on the rear side of the aperture A, and the group interval D has an error of +0.1 mm in the comparative example 1, the changing amounts of the angles of view are 1.5°, 6.3° and 3.3°, respectively. That is, regarding an objective lens for an endoscope in the comparative example 1, the changing amount of the angle of view with respect to each error is large relative to the changing amount of the angle of view in the second example. Therefore, regarding the comparative example 1, the changing amount of the angle of view of the entire objective lens can not be suppressed, and therefore it becomes difficult to secure the angle of view satisfying required specification. Furthermore, the changing amount of the angle of view caused when the lens interval between the lenses in the neighborhood of the aperture is larger than or equal to 4.0°, and therefore considerable influence is exerted on the changing amount of the angle of view.

Let us consider the case where installed positions of the lenses in the neighborhood of the aperture stop A shift by 0.01 mm, in the direction orthogonal to the optical axis of the entire objective lens 100, with respect to design positions of the lenses. When the installed position of the positive lens L2 and the installed position of the positive lens L3 shift as described above, the changing amounts of the angles of view at the maximum image height (i.e., the difference between the image surface FC and the image surface FC' at the maximum image height shown in FIG. 22A) are 4 µm and 1 µm, respectively. As described above, regarding the objective lens 100 according to the second example, the changing amount of the curvature of field is suppressed to be a small level in each of the above described changing amounts of the angle of view (i.e., the changing amount of the curvature of field is suppressed to a vale lower than or equal to 6 µm), and therefore high optical performance can be secured. It should be noted that, in order to secure required optical performance in the technical field of endoscopes, it is generally considered that the changing amount of the curvature of field should be suppressed to a value lower than or equal to 6 µm with respect to the above described deviation of 0.01 mm.

When the installed position of the lens on the front side of the aperture stop and the installed position of the lens on the rear side of the aperture stop shift as described above in the comparative example 1, the changing amounts of the curvature of field at the maximum image height are 17 µm and 15 µm, respectively. That is, regarding the objective lens according to the comparative example 1, on the whole, the changing amount of the curvature of field is larger than that of the objective lens 100 according to the second example. Therefore, an assembling error due to any one of the lenses causes a large changing amount of the angle of view, and therefore it is difficult to secure a high quality image.

Let us consider change of the angle of view caused when one of a lens thickness of one of the lenses in the neighborhood of the aperture A and an interval between the lenses in the neighborhood of the aperture A has an error of +0.1 mm in the third example and in the comparative example 2. When the lens thickness of the positive lens L2, the lens thickness of the positive lens L3 and the group interval D have an error of +0.1 mm in the third example, the changing amounts of the angles of view are 1.2°, 1.2° and 2.5°, respectively. That is, regarding the objective lens 100 according to the third example, the changing amounts of the angles of view with respect to each error and the average of the changing amounts can be suppressed to a low level (i.e., to the 4.0° and 2.0° respectively), and therefore the high optical performance can be secured.

When each of the lens thickness of the lens on the front side of the aperture A, the lens thickness of the lens on the rear side of the aperture A, and the group interval D has an error of +0.1 mm in the comparative example 2, the changing amounts of the angles of view are 2.4°, 1.9° and 4.0°, respectively. That is, regarding an objective lens for an endoscope in the comparative example 2, the changing amount of the angle of view with respect to each error is large relative to the changing amount of the angle of view in the third example. Therefore, regarding the comparative example 2, the changing amount of the angle of view of the entire objective lens can not be suppressed, and therefore it becomes difficult to secure the angle of view satisfying required specification. Furthermore, the changing amount of the angle of view caused when the lens interval between the lenses in the neighborhood of the aperture is larger than or equal to 4.0°, and therefore considerable influence is exerted on the changing amount of the angle of view.

Let us consider the changing amount of the curvature of field caused when the installed position of each of the lenses in the neighborhood of the aperture stop shifts by 0.01 mm from the design position in the direction orthogonal to the optical axis of the entire objective lens in the third example and the comparative example 2. Regarding the third example, when the installed position of the positive lens L2 and the installed position of the positive lens L3 shift from the respective design positions as described above, the changing amounts of the curvature of field at the maximum image height are 4 µm and 2 µm, respectively. That is, regarding the objective lens 100 according to the third example, the changing amount of the curvature of field is suppressed to a small level (i.e., to a value smaller than or equal to 6 µm) for each of the above described cases. Therefore, the high optical performance can be secured.

When the installed position of the lens on the front side of the aperture stop and the installed position of the lens on the rear side of the aperture stop shift as described above in the comparative example 2, the changing amounts of the curvature of field at the maximum image height are 5 μm, and 8 μm, respectively. That is, regarding the objective lens according to the comparative example 2, on the whole, the changing amount of the curvature of field is larger than that of the objective lens 100 according to the third example. In particular, since the changing amount of the curvature of field caused when an error is caused on the installed position of the lens on the rear side of the aperture, it is difficult to secure the high image quality.

When each of the lens thickness of each of the positive lens L2 and the positive lens L3 on the optical axis, and the group interval D has an error of +0.1 mm in the objective lens according to the first example, the changing amounts of the angles of view are 0.3°, 0.2° and 0.5°, respectively. On the other hand, when each of the lens thickness of the each of the positive lens L2 and the positive lens L3 on the optical axis, and the group interval D has an error of +0.1 mm in the fourth example, the changing amounts of the angles of view are 1.2°, 1.2° and 2.5°, respectively. Furthermore, when the installed position of the positive lens L2 and the installed position of the positive lens L3 shift from the respective design positions as described above, the changing amounts of the curvature of field at the maximum image height are 4 μm and 6 μm, respectively. Regarding the fourth example, when the installed position of the positive lens L2 and the installed position of the positive lens L3 shift from the respective design positions as described above, the changing amounts of the curvature of field at the maximum image height are 2 μm and 6 μm, respectively. Thus, in each of the first and fourth examples, the changing amount of the curvature of field caused by change of the angle of view or deviated curvature of field due to a manufacturing error or an assembling error is suppressed to a small level, and therefore the high optical performance can be secured.

Although the present invention has been described in considerable detail with reference to certain preferred embodiments thereof, other embodiments are possible.

This application claims priority of Japanese Patent Application No. P2009-160289, filed on Jul. 6, 2009. The entire subject matter of the applications is incorporated herein by reference.

What is claimed is:

1. An objective lens for an endoscope, comprising:
a front lens group having a negative power; and
a rear lens group having a positive power arranged such that an aperture stop is positioned between the front lens group and the rear lens group,
wherein:
the front lens group comprises at least a front-side negative lens and a front-side positive lens arranged in this order from an object side;
the rear lens group comprises at least a rear-side positive lens and a cemented lens arranged in this order from the object side, the cemented lens being configured by cementing together a negative lens and a positive lens; and
the objective lens satisfies following conditions:

$$-4.5 \leq f_F/f \leq -2.0 \quad (1); \text{ and}$$

$$1.5 \leq f_{RP}/f \leq 2.5 \quad (2)$$

where $f_F$ (unit: mm) represents a focal length of the front lens group, f (unit: mm) represents a total focal length of the front lens group and the rear lens group, and $f_{RP}$ (unit: mm) represents a focal length of the rear-side positive lens.

2. The objective lens according to claim 1,
wherein:
an object side surface of the front-side positive lens is a convex surface formed to be an aspherical surface; and
the objective lens satisfies a condition:

$$-1.5 \leq f_{FP}/f_F \leq -0.5 \quad (3)$$

where $f_{FP}$ (unit: mm) represents a focal length of the front-side positive lens.

3. The objective lens according to claim 1,
wherein:
an image side surface of the rear-side positive lens is a convex surface formed to be an aspherical surface; and
the objective lens satisfies a condition:

$$-0.9 \leq f_{RP}/f_F \leq -0.4 \quad (4)$$

where $f_{RP}$ (unit: mm) represents a focal length of the rear-side positive lens.

4. The objective lens according to claim 1,
wherein:
an image side surface of the front-side negative lens is formed to be a concave surface; and
the front-side positive lens is configured such that an object side surface thereof is a convex surface and an image side surface thereof is a flat surface.

5. The objective lens according to claim 1,
wherein:
the rear-side positive lens is configured such that an object side surface thereof is one of a flat surface and a concave surface and an image side surface thereof is a convex surface; and
the negative lens of the cemented lens is a negative meniscus lens whose object side surface is formed to be a convex surface.

6. The objective lens according to claim 1,
wherein the objective lens satisfies a condition:

$$0.2 \leq D_F/D_R \leq 0.5 \quad (5)$$

where $D_F$ (unit: mm) represents a distance in air from an object side surface of the front-side positive lens to a surface of the aperture stop, and $D_R$ (unit: mm) represents a distance in air from the surface of the aperture stop to an image side surface of the rear-side positive lens.

7. The objective lens according to claim 1, wherein the objective lens has an angle of view larger than or equal to 130°.

8. An endoscope, comprising:
an elastic insertion unit; and
an objective lens arranged at a tip part of the elastic insertion unit,
wherein the objective lens comprises:
a front lens group having a negative power; and
a rear lens group having a positive power arranged such that an aperture stop is positioned between the front lens group and the rear lens group,
wherein:
the front lens group comprises at least a front-side negative lens and a front-side positive lens arranged in this order from an object side;
the rear lens group comprises at least a rear-side positive lens and a cemented lens arranged in this order from the object side, the cemented lens being configured by cementing together a negative lens and a positive lens; and the objective lens satisfies following conditions:

$$-4.5 \leq f_F/f \leq -2.0 \quad (1); \text{and}$$

$$1.5 \leq f_{RP}/f \leq 2.5 \quad (2)$$

where $f_F$ (unit: mm) represents a focal length of the front lens group, f (unit: mm) represents a total focal length of the front lens group and the rear lens group, and $f_{RP}$ (unit: mm) represents a focal length of the rear-side positive lens.

9. The endoscope according to claim 8, wherein:
an object side surface of the front-side positive lens is a convex surface formed to be an aspherical surface; and
the objective lens satisfies a condition:

$$-1.5 \leq f_{FP}/f_F \leq -0.5 \quad (3)$$

where $f_{FP}$ (unit: mm) represents a focal length of the front-side positive lens.

10. The endoscope according to claim 8, wherein:
an image side surface of the rear-side positive lens is a convex surface formed to be an aspherical surface; and
the objective lens satisfies a condition:

$$-0.9 \leq f_{RP}/f_F \leq -0.4 \quad (4)$$

where $f_{RP}$ (unit: mm) represents a focal length of the rear-side positive lens.

11. The endoscope according to claim 8, wherein:
an image side surface of the front-side negative lens is formed to be a concave surface; and
the front-side positive lens is configured such that an object side surface thereof is a convex surface and an image side surface thereof is a flat surface.

12. The endoscope according to claim 8, wherein:
the rear-side positive lens is configured such that an object side surface thereof is one of a flat surface and a concave surface and an image side surface thereof is a convex surface; and
the negative lens of the cemented lens is a negative meniscus lens whose object side surface is formed to be a convex surface.

13. The endoscope according to claim 8, wherein the objective lens satisfies a condition:

$$0.2 \leq D_F/D_R \leq 0.5 \quad (5)$$

where $D_F$ (unit: mm) represents a distance in air from an object side surface of the front-side positive lens to a surface of the aperture stop, and $D_R$ (unit: mm) represents a distance in air from the surface of the aperture stop to an image side surface of the rear-side positive lens.

14. The endoscope according to claim 8, wherein the objective lens has an angle of view larger than or equal to 130°.

* * * * *